United States Patent
Shui

(10) Patent No.: US 11,637,589 B2
(45) Date of Patent: Apr. 25, 2023

(54) POWER LINE COMMUNICATION APPARATUS AND POWER GENERATING SYSTEM

(71) Applicant: Huawei Digital Power Technologies Co., Ltd., Shenzhen (CN)

(72) Inventor: Wei Shui, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/825,889

(22) Filed: May 26, 2022

(65) Prior Publication Data

US 2022/0286163 A1    Sep. 8, 2022

Related U.S. Application Data

(63) Continuation of application No. PCT/CN2020/131853, filed on Nov. 26, 2020.

(30) Foreign Application Priority Data

Nov. 28, 2019  (CN) .......................... 201911195151.6

(51) Int. Cl.
*H04B 3/54* (2006.01)
*H04B 3/56* (2006.01)
*H04B 3/28* (2006.01)

(52) U.S. Cl.
CPC ............... *H04B 3/546* (2013.01); *H04B 3/28* (2013.01)

(58) Field of Classification Search
CPC . H04B 3/28; H04B 3/54; H04B 3/546; H04B 3/56
See application file for complete search history.

(56) References Cited

U.S. PATENT DOCUMENTS 11,398,749 B2 * 7/2022 Braginsky .............. H04B 3/546
2006/0164099 A1   7/2006 Steennis et al.
(Continued)

FOREIGN PATENT DOCUMENTS

CN    101505175 A  *  8/2009   ............... H04B 3/54
CN    201821345 U     5/2011
(Continued)

OTHER PUBLICATIONS

Liu Yao et al.,"Broadband carrier communication technology based on cable shielding layers of distribution networks", East China Electric Power, vol. 35, No. 12, Dec. 2007, with an English partial machine translation, total 6 pages.

*Primary Examiner* — Blane J Jackson
(74) *Attorney, Agent, or Firm* — Rimon PC

(57) ABSTRACT

A power line communication apparatus includes a first power line communication device disposed at a signal transmit end, a second power line communication device disposed at a signal receive end, a power line, a first magnetic ring disposed at the signal transmit end, and a second magnetic ring disposed at the signal receive end. The second power line communication device receives the modulated signal from the power line. The power line includes a wire for transmitting electric energy and a shield layer that wraps the wire for electromagnetic shielding. The wire and the shield layer separately extend from the signal transmit end to the signal receive end. The first magnetic ring and the second magnetic ring are separately coupled to the shield layer, to suppress inductance attenuation of the magnetic ring and improve reliability of the transmitted modulated signal.

20 Claims, 15 Drawing Sheets

(56) References Cited

U.S. PATENT DOCUMENTS

2015/0008992 A1\* 1/2015 Black ................. H04B 1/707
333/24 R
2019/0106010 A1 4/2019 Logvinov et al.

FOREIGN PATENT DOCUMENTS

| CN | 202634425 U | 12/2012 | |
|---|---|---|---|
| CN | 203933616 A \* | 11/2014 | ............... H04B 3/54 |
| CN | 106506048 A \* | 3/2017 | ............... H04B 3/54 |
| CN | 207939277 U | 10/2018 | |
| CN | 208849763 U | 5/2019 | |
| CN | 110998246 A \* | 4/2020 | ........... G01F 1/3209 |
| EP | 0978952 A2 | 2/2000 | |
| JP | 2007087733 A | 4/2007 | |
| KR | 20150085005 A \* | 7/2015 | ............... H04B 3/54 |
| WO | 2012032932 A1 | 3/2012 | |
| WO | WO-2021057054 A1 \* | 4/2021 | ............. H02S 40/30 |
| WO | WO-2021104386 A1 \* | 6/2021 | ............... H04B 3/28 |

\* cited by examiner

POWER LINE COMMUNICATION APPARATUS AND POWER GENERATING SYSTEM

CROSS-REFERENCE TO RELATED APPLICATIONS

This application is a continuation of International Application No. PCT/CN2020/131853, filed on Nov. 26, 2020, which claims priority to Chinese Patent Application No. 201911195151.6, filed on Nov. 28, 2019. The disclosures of the aforementioned applications are hereby incorporated by reference in their entireties.

TECHNICAL FIELD

Embodiments of this application relate to power line communication technologies, and in particular, to a power line communication apparatus and a power generating system including the power line communication apparatus.

BACKGROUND

With the development of power electronics, new energy sources are widely used to produce electric energy for power generation. An existing solar power generating system generally includes various power devices for producing electric energy and converting electric energy, for example, a direct-current electric energy generating device (such as a photovoltaic array) and an inverter. Usually, distances between the power devices are relatively long (for example, a distance between the direct-current electric energy generating device and the inverter is 1 km). For signal interaction between remote devices, a signal is usually transmitted through power line communication (PLC).

In related PLC signal transmission, a magnetic ring is usually disposed on a power line to couple a signal to the power line, or the magnetic ring is used to increase input and output impedance between two power lines to reduce signal attenuation. Usually, the power line further transmits electric energy while transmitting a modulated signal. The electric energy generally has a relatively large current. However, when a large current flows through the magnetic ring, magnetic induction strength of the magnetic ring quickly reaches a maximum value, causing magnetic saturation of the magnetic ring and a relatively large inductance attenuation of the magnetic ring. As a result, a PLC signal is attenuated, and the reliability of the signal transmission is reduced. Therefore, improving the reliability of PLC signal transmission in a power line communication apparatus is an issue.

SUMMARY

In a power line communication apparatus provided in this application, a magnetic ring is disposed at a shield layer or a line not for transmitting electric energy in a power line, to effectively reduce a magnetic saturation of the magnetic ring, maintain relatively high inductance of the magnetic ring, reduce attenuation of a PLC signal, and improve reliability of PLC signal transmission.

To resolve the foregoing technical problem, the following technical solutions are used in this application.

According to a first aspect, an embodiment of this application provides a power line communication apparatus. The power line communication apparatus includes a first power line communication device disposed at a signal transmit end, a second power line communication device disposed at a signal receive end, a power line, a first magnetic ring disposed at the signal transmit end, and a second magnetic ring disposed at the signal receive end. Under actions of the first magnetic ring and the second magnetic ring, the power line transmits, from the signal transmit end to the signal receive end, a modulated signal coupled by the first power line communication device, so that the second power line communication device receives the modulated signal from the power line. The power line includes a wire for transmitting electric energy and a shield layer that wraps the wire for electromagnetic shielding. The wire and the shield layer separately extend from the signal transmit end to the signal receive end. The first magnetic ring and the second magnetic ring are separately coupled to the shield layer.

In the power line communication apparatus provided in this embodiment of this application, the first magnetic ring and the second magnetic ring are coupled to the shield layer of the power line. Because the shield layer is insulated from a wire core in the power line, no large current flows through the shield layer, thereby suppressing a reduction of magnetic permeability of the magnetic ring, suppressing an inductance attenuation of the magnetic ring, and improving the reliability of the transmitted modulated signal.

With reference to the first aspect, in a possible implementation, an output end of the first power line communication device is coupled to the first magnetic ring. The modulated signal is coupled to the wire and the shield layer through the first magnetic ring, and is transmitted from the signal transmit end to the signal receive end.

With reference to the first aspect, in a possible implementation, a first signal output end of the first power line communication device is coupled to the wire through a first capacitor, and a second signal output end of the first power line communication device is coupled to the shield layer through a second capacitor. The modulated signal is coupled to the wire and the shield layer through the first capacitor and the second capacitor, and is transmitted from the signal transmit end to the signal receive end.

With reference to the first aspect, in a possible implementation, an output end of the second power line communication device is coupled to the second magnetic ring. The second power line device receives the modulated signal from the wire and the shield layer through the second magnetic ring.

With reference to the first aspect, in a possible implementation, a first signal receive end of the second power line communication device is coupled to the wire through a third capacitor, and a second signal receive end of the second power line communication device is coupled to the shield layer through a fourth capacitor. The second power line communication device receives the modulated signal from the wire and the shield layer through the third capacitor and the fourth capacitor.

The modulated signal is coupled to the shield layer and the wire of the power line, and the modulated signal is transmitted through the shield layer and the wire. Because no power current flows through the shield layer, the impact of a power current on the modulated signal during transmission of the modulated signal can be reduced, thereby improving the stability of the signal transmission.

With reference to the first aspect, in a possible implementation, the power line communication apparatus further includes a fifth capacitor and a sixth capacitor. At the signal transmit end, the wire is coupled to the shield layer through the fifth capacitor. At the signal receive end, the wire is coupled to the shield layer through the sixth capacitor.

In this embodiment of this application, the fifth capacitor and the sixth capacitor are removed. When signal transmission is performed through electromagnetic coupling, the modulated signal on the shield layer side may be transmitted to the wire through the fifth capacitor and the sixth capacitor. In addition, distributed capacitance, distributed inductance, and the like of each wire can be further reduced, thereby helping improve stability of the modulated signal.

According to a second aspect, an embodiment of this application provides a power line communication apparatus. The power line communication apparatus includes a first power line communication device disposed at a signal transmit end, a second power line communication device disposed at a signal receive end, a power line, a first magnetic ring disposed at the signal transmit end, and a second magnetic ring disposed at the signal receive end. Under actions of the first magnetic ring and the second magnetic ring, the power line transmits, from the signal transmit end to the signal receive end, a modulated signal coupled by the first power line communication device, so that the second power line communication device receives the modulated signal from the power line. The power line includes a first line for transmitting electric energy and a second line not for transmitting electric energy. The first magnetic ring and the second magnetic ring are coupled to the second line.

In the power line communication apparatus provided in this embodiment of this application, the first magnetic ring and the second magnetic ring are coupled to a line not for transmitting electric energy in the power line. Because no large current flows through the line not for transmitting electric energy, a reduction of magnetic permeability of the magnetic ring can be suppressed, thereby suppressing an inductance attenuation of the magnetic ring, and improving the reliability of the transmitted modulated signal.

With reference to the second aspect, in a possible implementation, the first line and the second line separately extend from the signal transmit end to the signal receive end, and the first line and the second line are insulated from each other. In this implementation, the modulated signal is coupled to the first line and the second line, and the modulated signal is transmitted through the first line and the second line. Because no power current flows through the second line, the impact of a power current on the modulated signal during transmission of the modulated signal can be reduced, thereby improving the stability of the signal transmission.

With reference to the second aspect, in a possible implementation, the first line includes a first sub-line and a second sub-line, at least four second lines are included, and the power line communication apparatus further includes a first capacitor and a second capacitor. The first line extends from the signal transmit end to the signal receive end. At the signal transmit end, the first capacitor is coupled between the first sub-line and the second sub-line through two of the second lines. At the signal receive end, the second capacitor is coupled between the first sub-line and the second sub-line through two of the second lines. The first magnetic ring is coupled to one of the second lines located at the signal transmit end. The second magnetic ring is coupled to one of the second lines located at the signal receive end. In this optional implementation, the first capacitor and the second capacitor are filter capacitors, to filter out a differential-mode signal and the like on the line. No power current flows through a line (the second line) that connects the first capacitor and the second capacitor between two power lines (that is, the first sub-line and the second sub-line). The magnetic ring is coupled to the second line, so that an impact of a power current on the modulated signal during transmission of the modulated signal can be reduced, thereby improving the stability of the signal transmission. In addition, when the capacitances of the first capacitor and the second capacitor are so small that impedance generated by the first capacitor and the second capacitor can be totally ignored with respect to the modulated signal, a first magnetic ring and a second magnetic ring with quite small inductance may be alternatively used, so that volumes of the first magnetic ring and the second magnetic ring can be reduced, and a structure of the power line communication apparatus is simplified to reduce costs.

With reference to the second aspect, in a possible implementation, an output end of the first power line communication device is coupled to the first magnetic ring. The modulated signal is coupled to the first sub-line and the second sub-line through the first magnetic ring, and is transmitted from the signal transmit end to the signal receive end.

With reference to the second aspect, in a possible implementation, a first signal output end of the first power line communication device is coupled to the first line through a third capacitor, and a second signal output end of the first power line communication device is coupled to the second line through a fourth capacitor. The modulated signal is coupled to the first line and the second line through the third capacitor and the fourth capacitor, and is transmitted from the signal transmit end to the signal receive end.

With reference to the second aspect, in a possible implementation, an output end of the second power line communication device is coupled to the second magnetic ring. The second power line device receives the modulated signal from the first sub-line and the second sub-line through the second magnetic ring.

With reference to the second aspect, in a possible implementation, a first signal receive end of the second power line communication device is coupled to the first sub-line through a fifth capacitor, and a second signal receive end of the second power line communication device is coupled to the second sub-line through a sixth capacitor. The second power line communication device receives the modulated signal from the first sub-line and the second sub-line through the fifth capacitor and the sixth capacitor.

With reference to the second aspect, in a possible implementation, electric energy transmitted by the power line is direct-current electric energy or alternating-current electric energy.

According to a third aspect, an embodiment of this application provides a power generating system. The power generating system includes a plurality of power devices. The power line communication apparatus according to the first aspect or the power line communication apparatus according to the second aspect is disposed between every two of the power devices. An intermediate- or high-frequency signal between every two of the power devices is transmitted through a power line routed between the two power devices.

Specifically, the power devices include but are not limited to a photovoltaic module, an inverter, a transformer, a combiner box, and a data monitor. The power line communication apparatus according to the first aspect or the second aspect may be disposed between the photovoltaic module and the inverter, and an intermediate- or high-frequency signal between the photovoltaic module or array and the inverter is transmitted through a power line routed between the photovoltaic array and the inverter. The power line communication apparatus according to the first aspect or the second aspect may be disposed between the transformer and the inverter, and an intermediate- or high-frequency signal between the inverter and the transformer is transmitted through a power line routed between the inverter and the transformer. The power line communication apparatus according to the first aspect or the second aspect may be disposed between the photovoltaic array and the combiner box, and an intermediate- or high-frequency signal between the photovoltaic array and the combiner box is transmitted through a power line routed between the photovoltaic array and the combiner box. The power line communication apparatus according to the first aspect or the second aspect may be disposed between the combiner box and the inverter, and an intermediate- or high-frequency signal between the combiner box and the inverter is transmitted through a power line routed between the combiner box and the inverter. The data monitor is configured to monitor data of the photovoltaic array and the inverter. The power line communication apparatus according to the first aspect or the second aspect is disposed between the data monitor and at least one of the photovoltaic array and the inverter.

BRIEF DESCRIPTION OF DRAWINGS

To describe the technical solutions in embodiments of this application more clearly, the following briefly describes the accompanying drawings for describing embodiments of this application. It is clear that, the accompanying drawings in the following description show merely a part of embodiments of this application, and a person of ordinary skill in the art may derive other drawings from these accompanying drawings without creative efforts.

DESCRIPTION OF EMBODIMENTS

The following clearly describes the technical solutions in embodiments of this application with reference to the accompanying drawings in embodiments of this application. It is clear that, the described embodiments are a part but not all of embodiments of this application. All other embodiments obtained by a person of ordinary skill in the art based on embodiments of this application without creative efforts shall fall within the protection scope of this application.

"First", "second", or the like mentioned in this specification does not indicate any order, quantity, or importance, but is used only for distinguishing between different components. Likewise, "a/an", "one", or the like does not indicate a quantity limitation either, but is intended to indicate that at least one exists. "Connection", "link", or the like is not limited to a physical or mechanical connection, but may include an electrical connection, whether directly or indirectly.

In embodiments of this application, the term "and/or" describes an association relationship between associated objects, and represents that three relationships may exist. For example, A and/or B may represent the following three cases: only A exists, both A and B exist, and only B exists.

In embodiments of this application, the word "example" or "for example" is used to represent giving an example, an illustration, or a description. Any embodiment or design scheme described as "example" or "for example" in embodiments of this application should not be explained as being more preferred or having more advantages than another embodiment or design scheme. Exactly, use of the word such as "example" or "for example" is intended to present a related concept in a specific manner.

In the description of embodiments of this application, unless otherwise stated, "a plurality of" means two or more than two. For example, a plurality of lines mean two or more than two lines, and a plurality of apparatuses mean two or more than two apparatuses.

To make the objectives, technical solutions, and advantages of this application clearer, the following clearly and completely describes the technical solutions in this application with reference to the accompanying drawings in this application. It is clear that, the described embodiments are merely a part rather than all of embodiments of this application. All other embodiments obtained by a person of ordinary skill in the art based on embodiments of this application without creative efforts shall fall within the protection scope of this application.

Figure 1:
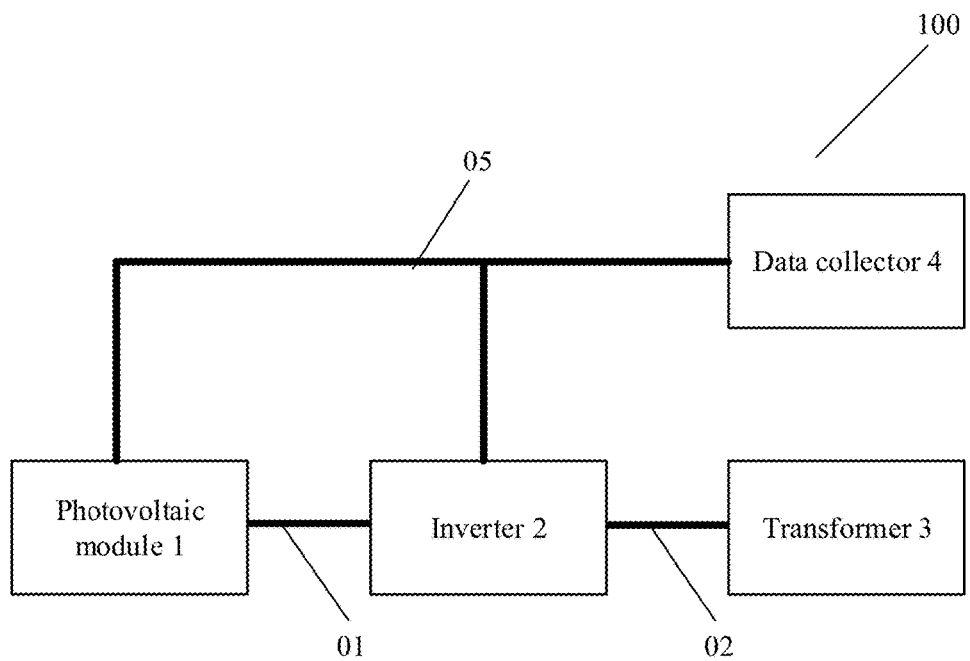
FIG. 1 is a schematic diagram of a structure of a power generating system according to an embodiment of this application.

FIG. 1 is a schematic diagram of a structure of a power generating system according to an embodiment of this application. The power generating system shown in FIG. 1 is a solar power generating system. In FIG. 1, the power generating system includes a plurality of power devices. The power devices include a photovoltaic module 1, an inverter 2, a transformer 3, and a data collector 4.

A plurality of photovoltaic modules 1 may be included. The plurality of photovoltaic modules are usually arranged in an array, referred to as a photovoltaic array. The photovoltaic modules are battery packs that are exposed to sunlight and that convert light energy into direct-current electric energy for power generation. During actual use, the photovoltaic modules are usually grouped to generate required direct-current electric energy. The inverter 2 is configured to convert the direct-current electric energy generated by the photovoltaic modules into alternating-current electric energy. The transformer 3 is configured to boost the alternating-current electric energy generated by the inverter 2, and then input the alternating-current electric energy to a power grid for electric energy transmission. The data collector 4 is configured to collect data such as operating parameters and electric energy output of the photovoltaic module 1 and the inverter 2, and then may monitor operating statuses of the photovoltaic module 1 and the inverter 2 based on the collected data (for example, monitor whether the inverter 2 operates abnormally, and control the inverter 2 to start or shut down). In this embodiment, the inverter 2 may be a string inverter or a centralized inverter. When the inverter 2 is a centralized inverter, usually, a maximum power point tracking (MPPT) combiner box 5 is further disposed between the photovoltaic module 1 and the inverter 2, as shown in FIG. 2.

Figure 2:
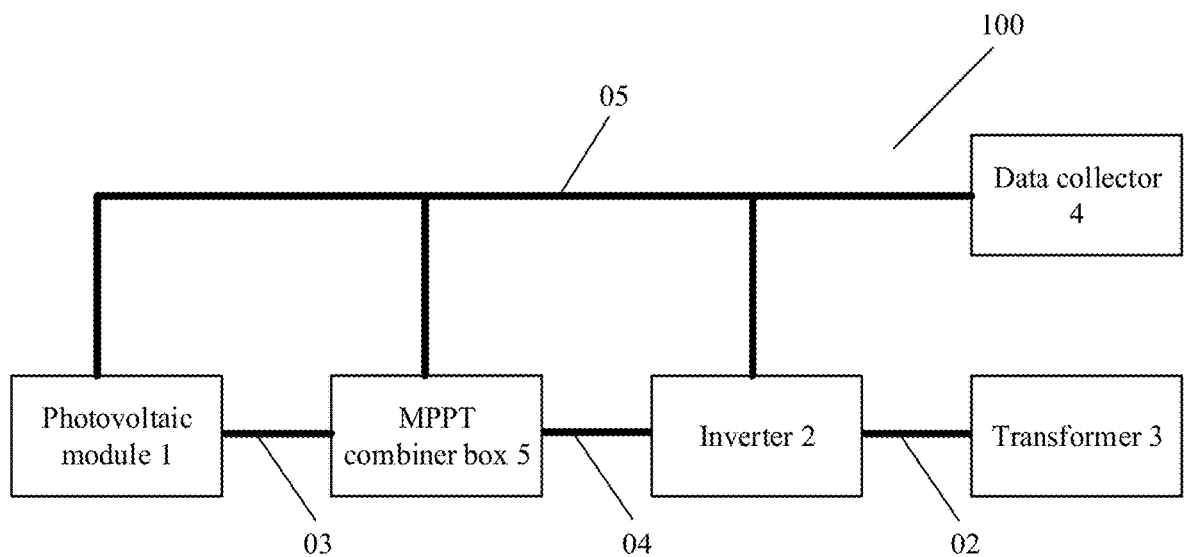
FIG. 2 is a schematic diagram of another structure of a power generating system according to an embodiment of this application.

The power generating system 100 shown in FIG. 1 or FIG. 2 further includes a power line configured to transmit electric energy. Specifically, a power line 01 configured to transmit the direct-current electric energy generated by the photovoltaic module 1 to the inverter 2 is disposed between the photovoltaic module 1 and the inverter 2 shown in FIG. 1, a power line 03 configured to transmit the direct-current power generated by the photovoltaic module to the MPPT combiner box is disposed between the photovoltaic module 1 and the MPPT combiner box 5 shown in FIG. 2, and a power line 04 configured to transmit direct-current power aggregated by the MPPT combiner box to the inverter 2 is disposed between the MPPT combiner box 5 and the inverter 2. In the power generating system 100 shown in FIG. 1 or FIG. 2, a power line 02 configured to transmit the alternating-current power generated by the inverter 2 to the transformer 3 is disposed between the inverter 2 and the transformer 3, and a power line 05 is further disposed between the data collector 4 and the photovoltaic module 1, the inverter 2, and the MPPT combiner box 5. The power line 01, the power line 03, and the power line 04 may be direct-current lines. The power line 02 and the power line 05 may be alternating-current lines.

Figure 3:
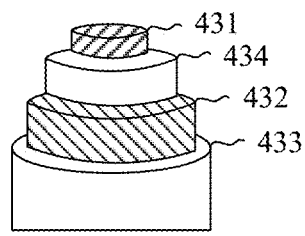
FIG. 3 is a schematic diagram of an internal structure of a power line according to an embodiment of this application.
Figure 4:
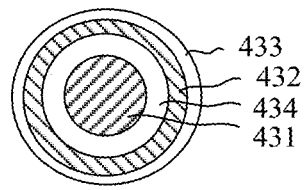
FIG. 4 is a top view of the power line shown in FIG. 3.

The power line shown in this embodiment of this application may have a single-core line structure, as shown in FIG. 3. FIG. 3 is a schematic diagram of an internal structure of a power line according to an embodiment of this application. FIG. 4 is a top view of the power line shown in FIG. 3. In FIG. 3 and FIG. 4, the power line includes a wire 431, a shield layer 432 for electromagnetic shielding, a first insulation layer 433 that wraps the shield layer 432, and a second insulation layer 434 for insulation between the wire 431 and the shield layer 432. Usually, the shield layer 432 may be made of a conducting material with electromagnetic insulation performance. When each power line shown in FIG. 2 has a single-core line structure, at least two power lines 01, at least two power lines 03, and at least two power lines 04 are included, where at least one of the power lines is a positive line, and at least one of the power lines is a negative line; and at least three power lines 02 and at least three power lines 05 may be included, where at least one of the power lines is a live line, one of the power lines is a neutral line, and one of the power lines is a ground line.

The power line shown in this embodiment of this application may have a multi-core line structure. To be specific, a plurality of wires share one shield layer and first insulation layer, and a second insulation layer is used for insulation between the plurality of wires and between the wires and the shield layer.

Figure 5:
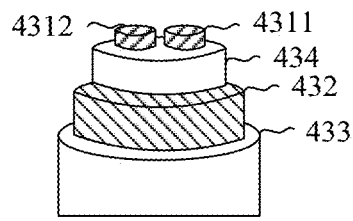
FIG. 5 is a schematic diagram of another internal structure of a power line according to an embodiment of this application.
Figure 6:
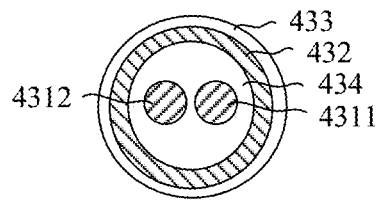
FIG. 6 is a top view of the power line shown in FIG. 5.

FIG. 5 is a schematic diagram of a power line with a dual-core line structure. FIG. 6 is a top view of the power line shown in FIG. 5. In FIG. 5 and FIG. 6, the power line includes a wire 4311, a wire 4312, a shield layer 432 for electromagnetic shielding, a first insulation layer 433 that wraps the shield layer 432, and a second insulation layer 434 for insulation between the wire 4311 and the wire 4312 and between the wires and the shield layer 432. The wire 4311 may be a positive line, and the wire 4312 may be a negative line; or the wire 4311 may be a line for transmitting electric energy (for example, one of a positive line, a negative line, a live line, and a neutral line), and the wire 4312 may be a line not for transmitting electric energy.

Figure 7:
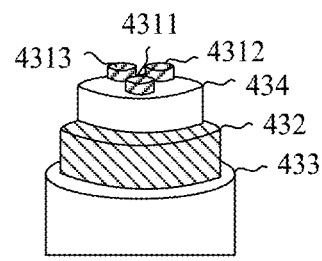
FIG. 7 is a schematic diagram of another internal structure of a power line according to an embodiment of this application.
Figure 8:
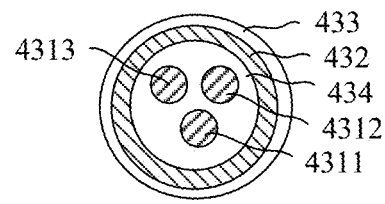
FIG. 8 is a top view of the power line shown in FIG. 7.

FIG. 7 is a schematic diagram of a power line with a three-core line structure. FIG. 8 is a top view of the power line shown in FIG. 7. In FIG. 7 and FIG. 8, the power line includes a wire 4311, a wire 4312, a wire 4313, a shield layer 432 for electromagnetic shielding, a first insulation layer 433 that wraps the shield layer 432, and a second insulation layer 434 for insulation between the wire 4311, the wire 4312, and the wire 4313 and between the wires and the shield layer 432. The wire 4311 may be a positive line, the wire 4312 may be a negative line, and the wire 4313 may be a line not for transmitting electric energy; or the wire 4311 may be a live line, the wire 4312 may be a neutral line, and the wire 4313 may be a ground line.

When the power line shown in FIG. 2 has a multi-core line structure, the power line 01, the power line 03, and the power line 04 each may include at least one power line with the dual-core line structure shown in FIG. 5, where the wire 4311 may be a positive line, and the wire 4312 may be a negative line. The power line 01, the power line 03, and the power line 04 each may include at least one power line with the three-core line structure shown in FIG. 7, where the wire 4311 may be a positive line, the wire 4312 may be a negative line, and the wire 4313 may be a line not for transmitting electric energy. The power line 02 and the power line 05 each may include at least one power line with the three-core line structure shown in FIG. 7, where the wire 4311 may be a live line, the wire 4312 may be a neutral line, and the wire 4313 may be a ground line.

In addition to electric energy transmission, signal transmission, that is, data exchange, is also usually performed between any two of the foregoing devices. In long-distance signal transmission between devices, that is, when a distance between two devices is greater than 1 km, signal interaction is usually performed through power line communication (PLC), also referred to as carrier communication. In other words, a PLC transmission mode may be used when a distance between any two of the power devices included in the power generating system shown in this application is relatively large and long-distance signal transmission needs to be performed. To be specific, after a signal that needs to be transmitted is modulated, the modulated signal is coupled to the power line for transmission (for example, when the power line transmits direct-current electric energy, the modulated signal is coupled to the positive line and the negative line for transmission; or when the power line transmits alternating-current electric energy, the modulated signal is coupled to the live line and the neutral line for transmission). For example, when a signal is transmitted between the MPPT combiner box 5 and the inverter 2, for example, when the MPPT combiner box 5 sends a signal to the inverter 2, the MPPT combiner box modulates the signal and then couples a modulated signal to the power line 04, to transmit the signal to the inverter 2. After receiving the modulated signal, the inverter 2 may obtain data by demodulating the modulated signal.

Figure 9:
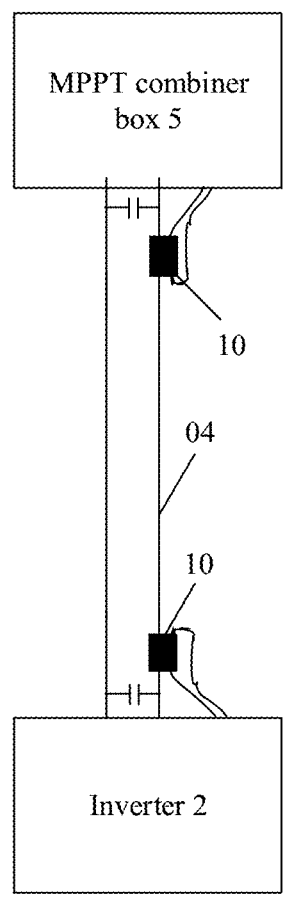
FIG. 9 is a schematic diagram of a structure of a power line communication apparatus in a conventional technology.

In conventional PLC signal transmission, as shown in FIG. 9, for example, a PLC signal is used between the MPPT combiner box 5 and the inverter 2. A magnetic ring 10 is usually disposed on one line (a positive line or a negative line) of the power line 04 on a side of the MPPT combiner box 5. A signal output end of the MPPT combiner box 5 passes through the magnetic ring, so that the signal output end can couple the signal to the power line 04 through the magnetic ring 10. Usually, the MPPT combiner box 5 also transmits direct-current electric energy through the power line 04 while transmitting the signal to the inverter 2 through the power line 04. Usually, a magnetic induction strength of the magnetic ring 10 gradually increases as a current passing through the magnetic ring 10 gradually increases. The magnetic induction strength of the magnetic ring 10 does not increase with an increase of the current after the magnetic induction strength of the magnetic ring 10 has increased to a specific value. However, in this case, the magnetic field strength around the magnetic ring 10 continues to increase. As a result, a magnetic permeability of the magnetic ring 10 gradually decreases. Inductance of the magnetic ring 10 is directly proportional to the magnetic permeability. Therefore, the inductance of the magnetic ring 10 gradually decreases until the magnetic ring 10 reaches magnetic saturation. In this case, the inductance of the magnetic ring 10 approaches 0. However, a current transmitted in the power generating system is usually relatively large, thereby causing sharp inductance attenuation of the magnetic ring 10, and further causing attenuation of the transmitted signal and reduced reliability of the transmitted signal.

When a PLC signal is transmitted in the foregoing large-current scenario, a magnetic ring with relatively high initial magnetic permeability, that is, a relatively high inductance, is usually used. As a result, a volume of the magnetic ring is relatively large, and a relatively high requirement is imposed on the material of the magnetic ring and a production process of the magnetic ring, thereby increasing costs of PLC signal transmission and the complexity of a spatial structure of the power system.

Based on the foregoing PLC transmission mode, a power line communication apparatus provided in this application is used for PLC signal transmission between any two power devices in the power generating system 100. It should be noted that, in addition to PLC signal transmission between any two devices of the photovoltaic module 1, the inverter 2, the transformer 3, the data collector 4, and the MPPT combiner box 5 in the power generating system 100, the power line communication apparatus provided in this application may also be used for PLC signal transmission between other devices that are included in the power generating system 100 and that are not shown.

In the power line communication apparatus provided in this application, a magnetic ring is coupled to a shield layer or a line not for transmitting electric energy in a power line, to effectively reduce attenuation of magnetic permeability of the magnetic ring, and improve reliability of a transmitted signal.

The following describes in detail the power line communication apparatus shown in this application by using embodiments shown in FIG. 10 to FIG. 21. In the embodiments shown in FIG. 10 to FIG. 21, a first power line communication device 41, a second power line communication device 42, a power line for transmitting a PLC signal, a first magnetic ring L1 disposed on a side of the first power line communication device 41, and a second magnetic ring L2 disposed on a side of the second power line communication device are included. The power line in the embodiments shown in FIG. 10 to FIG. 21 may be the power line 04 shown in FIG. 2. The first power line communication device 41 and the second power line communication device 42 are respectively disposed in two power devices between which a PLC signal is transmitted. For example, a PLC signal is transmitted between the MPPT combiner box 5 and the inverter 2 shown in FIG. 2. The first power line communication device 41 may be disposed in the MPPT combiner box 5, and the second power line communication device 42 may be disposed in the inverter 2. Herein, the MPPT combiner box 5 may send a signal to the inverter 2, or may receive a signal from the inverter 2. When the MPPT combiner box 5 sends a signal to the inverter 2, the MPPT combiner box 5 is a signal transmit end, and the inverter 2 is a signal receive end. When the MPPT combiner box 5 receives a signal from the inverter 2, the MPPT combiner box 5 is a signal receive end, and the inverter 2 is a signal transmit end.

In the embodiments shown in FIG. 10 to FIG. 21, both the first power line communication device 41 and the second power line communication device 42 have a function of modulating and demodulating a PLC signal. The first power line communication device 41 may include a first end V411 and a second end V412. The second power line communication device 42 may include a first end V421 and a second end V422. After modulating an original signal sent by the MPPT combiner box 5 to the inverter 2, the first power line communication device 41 couples a modulated signal to the power line through the first end V411 and the second end V412, and the power line transmits the modulated signal from the signal transmit end to the signal receive end. The second power line communication device 42 may receive the modulated signal from the power line through the first end V421 and the second end V422, and then demodulate the received modulated signal to obtain the original signal.

The following describes in detail a specific structure and a signal coupling manner of the power line communication apparatus by using an example in which the MPPT combiner box 5 is a signal transmit end, the inverter 2 is a signal receive end, and the power line between the MPPT combiner box 5 and the inverter 2 is a single-core line.

Figure 10:
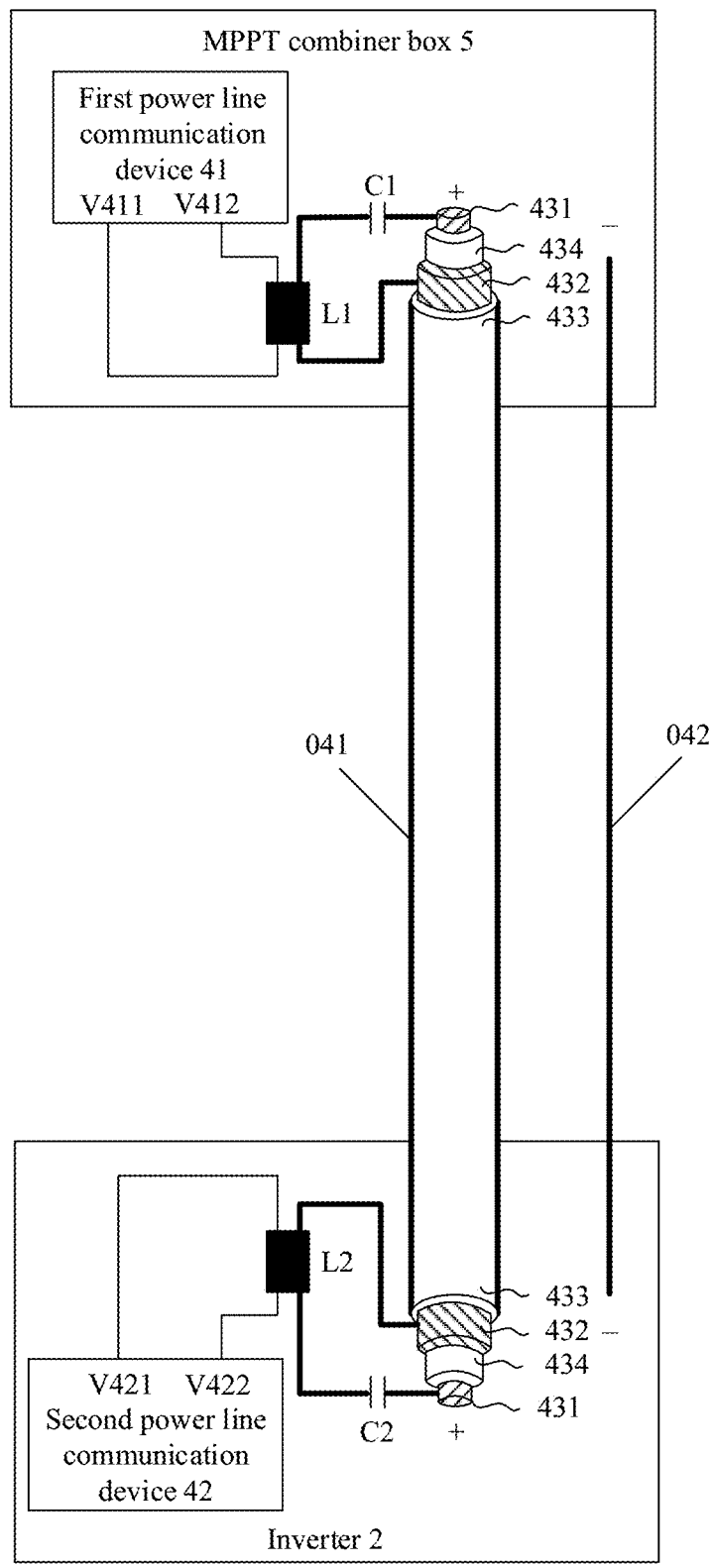
FIG. 10 is a schematic diagram of a structure of a power line communication apparatus according to an embodiment of this application.

FIG. 10 is a schematic diagram of a structure of a power line communication apparatus according to an embodiment of this application.

In the power line communication apparatus shown in FIG. 10, the power line includes a positive line 041 and a negative line 042, and the positive line 041 and the negative line 042 are configured to transmit direct-current electric energy. The positive line 041 and the negative line 042 have a same structure. On a side of a signal transmit end and a side of a signal receive end, a wire and a shield layer of one power line (which may be the positive line 041 shown in FIG. 10 or the negative line 042 shown in FIG. 10) are exposed for coupling components such as a magnetic ring. FIG. 10 schematically shows that a wire and a shield layer of the positive line 041 are exposed. A wire and a shield layer of the negative line 042 may not be exposed because no magnetic ring or the like needs to be coupled to the wire or the shield layer. In FIG. 10, the negative line 042 is replaced with a straight line segment, and a specific structure is not shown.

At the signal transmit end, an OT terminal may be disposed at the exposed shield layer 432, and a wire may extend out from the OT terminal. The wire passes through the first magnetic ring L1, that is, the first magnetic ring L1 is coupled to the shield layer through the wire. At the signal receive end, an OT terminal may also be disposed at the exposed shield layer 432, and a wire may extend out from the OT terminal. The wire passes through the second magnetic ring L2, that is, the second magnetic ring L2 is coupled to the shield layer through the wire. Because the shield layer does not transmit electric energy, for the first magnetic ring L1 and the second magnetic ring L2, the inductance of the magnetic rings does not sharply decrease due to an excessively large current transmitted on the power line, thereby improving the stability of the magnetic rings.

In a possible implementation, the signal transmit end couples a modulated signal to the power line through electromagnetic coupling, and the signal receive end receives the modulated signal from the power line through electromagnetic coupling.

Specifically, a line extending out from the first end V411 of the first power line communication device 41 is connected to the second end V412 of the first power line communication device 41 through the magnetic ring L1, and a line extending out from the first end V421 of the second power line communication device 42 is connected to the second end V422 of the second power line communication device 42 through the magnetic ring L2. In FIG. 10, the wire 431 and the shield layer 432 of the positive line 041 are configured to jointly transmit the modulated signal. Herein, the shield layer 432 and the wire 431 extend from the signal transmit end to the signal receive end. On the side of the signal transmit end, the shield layer 432 is connected to the wire 431 through a capacitor C1. On the side of the signal receive end, the shield layer 432 is connected to the wire 431 through a capacitor C2. The modulated signal transmitted by the first power line communication device 41 is coupled to the shield layer 432 through the first magnetic ring L1. The modulated signal is an intermediate- or high-frequency signal, and a frequency is usually within a frequency range of kHz to MHz. Therefore, the modulated signal coupled to the shield layer 432 is transmitted to the wire 431 through the capacitor C1, and a signal loop is formed between the shield layer 432 and the wire 431 to transmit the modulated signal to the signal receive end. At the signal receive end, the signal coupled to the wire 431 is transmitted to the shield layer through the capacitor C2. The second power line communication device 42 may receive the modulated signal from the shield layer through the second magnetic ring L2.

It can be learned from FIG. 10 that a modulated signal loop is formed by using the wire 431 for transmitting electric energy and the shield layer 432 not for transmitting electric energy, and the magnetic rings are disposed at the shield layer, thereby reducing signal attenuation and improving the reliability of the signal transmission.

Figure 11:
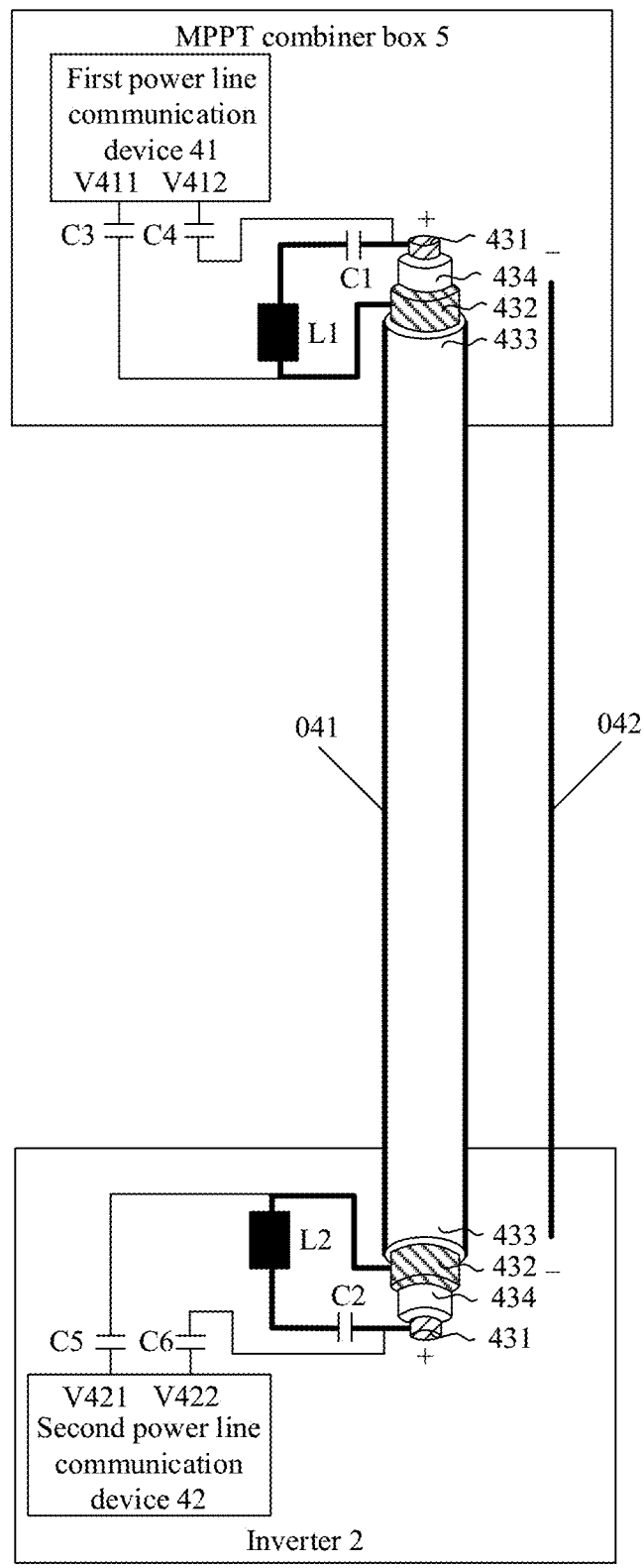
FIG. 11 is a schematic diagram of another structure of a power line communication apparatus according to an embodiment of this application.

In a possible implementation, the signal transmit end couples a modulated signal to the power line through capacitive coupling, and the signal receive end receives the modulated signal from the power line through capacitive coupling. FIG. 11 is a schematic diagram of a structure of another embodiment of the power line communication apparatus according to this application.

Specifically, the first end V411 of the first power line communication device 41 is connected to one end of a capacitor C3, the other end of the capacitor C3 is connected to the shield layer 432, the second end V412 of the first power line communication device 41 is connected to one end of a capacitor C4, the other end of the capacitor C4 is connected to the wire 431 of the positive line 041, the first end V421 of the second power line communication device 42 is connected to one end of a capacitor C5, the other end of the capacitor C5 is connected to the shield layer 432, the second end V422 of the second power line communication device 42 is connected to one end of a capacitor C6, and the other end of the capacitor C6 is connected to the wire 431 of the positive line 041.

The modulated signal transmitted by the first power line communication device 41 is coupled to the shield layer 432 and the wire 431 through the capacitor C3 and the capacitor C4 respectively, to transmit the modulated signal to the signal receive end. At the signal receive end, the second power line communication device 42 may receive the modulated signal from the shield layer 432 and the wire 431 through the capacitor C5 and the capacitor C6 respectively.

It can be learned from FIG. 11 that a signal loop is formed between the first end V411 and the second end V412 of the first power line communication device 41, the shield layer 432, the wire 431, and the first end V421 and the second end V422 of the second power line communication device 42. In this signal loop, a differential-mode noise signal is easily generated between the shield layer 432 and the wire 431 due to impact of various other external factors (for example, distributed inductance and distributed capacitance of a signal transmission medium). To suppress the differential-mode noise signal, a capacitor C1 is connected between the shield layer 432 and the wire 431 on a side of the signal transmit end, and a capacitor C2 is connected between the shield layer 432 and the wire 431 on a side of the signal receive end. The capacitor C1 and the capacitor C2 herein are filter capacitors. However, capacitances of the capacitor C1 and the capacitor C2 are usually at a microfarad level, and the impedances generated by the capacitor C1 and the capacitor C2 may be considered as small impedances with respect to an intermediate- or high-frequency modulated signal. Therefore, the modulated signal may flow from one side to another side through the capacitor C1 or the capacitor C2. In a process in which the modulated signal passes through the capacitor C1 or the capacitor C2, signal attenuation occurs, thereby affecting the reliability of a signal received by the receive end. In view of this, the first magnetic ring L1 and the second magnetic ring L2 shown in FIG. 11 are configured to provide large impedances. This is equivalent to producing an open circuit between the shield layer 432 and the wire 431, thereby suppressing transmission of the modulated signal on the capacitor C1 and the capacitor C2, and further suppressing signal attenuation. It can be learned from FIG. 11 that the first magnetic ring L1 and the second magnetic ring L2 are coupled to the shield layer 432, to suppress the inductance attenuation of the magnetic rings and keep impedance of the magnetic rings within a stable range.

It should be noted that there is usually a relatively small differential-mode noise signal between the shield layer and the wire, because one side for transmitting a PLC differential signal is the shield layer, no electric energy passes through the shield layer, and a current of the PLC signal is far less than that of the electric energy. Therefore, capacitors with relatively small capacitances may serve as the capacitor C1 and the capacitor C2. When the capacitances of the capacitor C1 and the capacitor C2 are so small that the impedance generated by the capacitor C1 and the capacitor C2 can be totally ignored with respect to the modulated signal, a first magnetic ring L1 and a second magnetic ring L2 with quite small inductances may be alternatively used, or no first magnetic ring L1 or second magnetic ring L2 may be used. This can further simplify a structure of the power line communication apparatus, thereby reducing costs.

Figure 12:
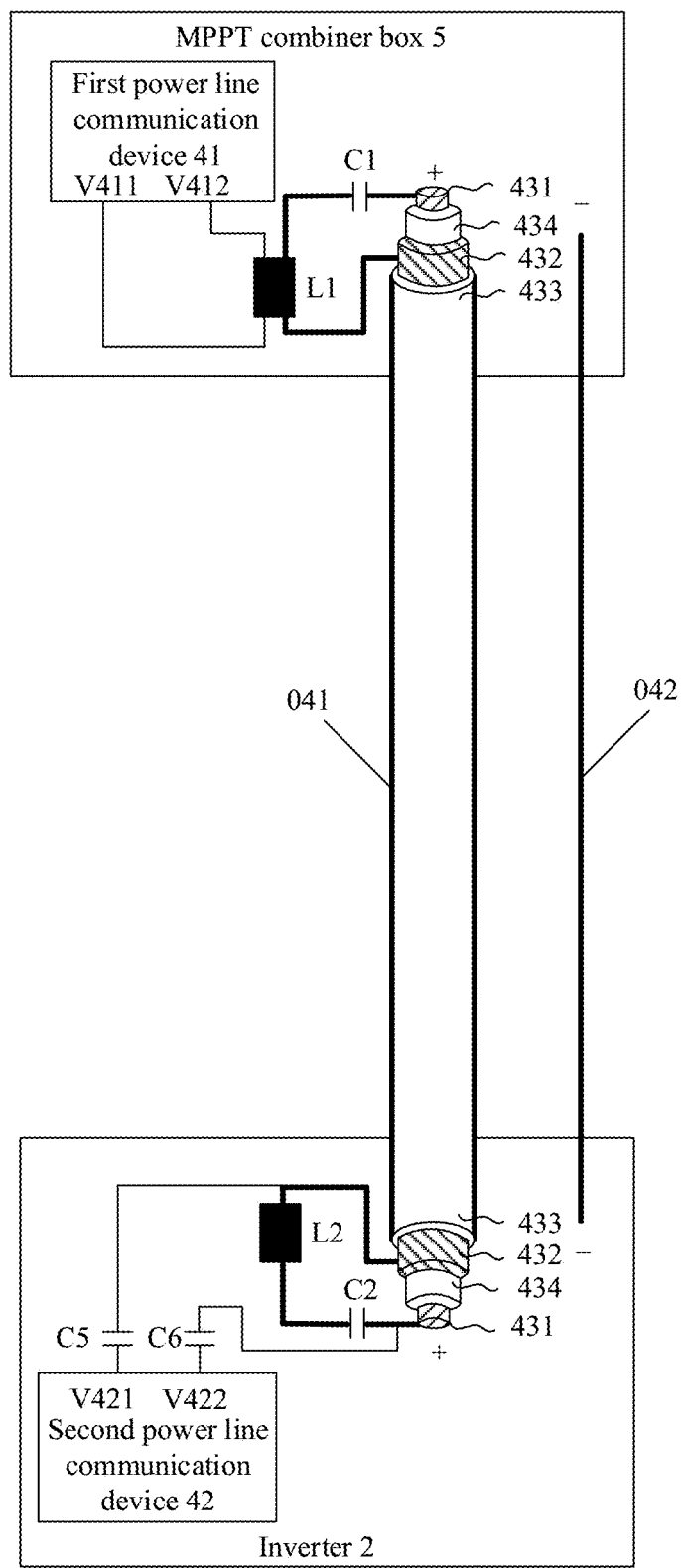
FIG. 12 is a schematic diagram of another structure of a power line communication apparatus according to an embodiment of this application.

In a possible implementation, the signal transmit end couples a modulated signal to the power line through electromagnetic coupling, and the signal receive end receives the modulated signal from the power line through capacitive coupling. In this case, a structure of the power line communication apparatus is shown in FIG. 12. In the power line communication apparatus shown in FIG. 12, for a specific structure and an operating principle on the side of the signal transmit end, refer to the related descriptions on the side of the signal transmit end shown in FIG. 10; and for a specific structure and an operating principle on the side of the signal receive end, refer to the related descriptions on the side of the signal receive end shown in FIG. 11. Details are not described herein again.

Figure 13:
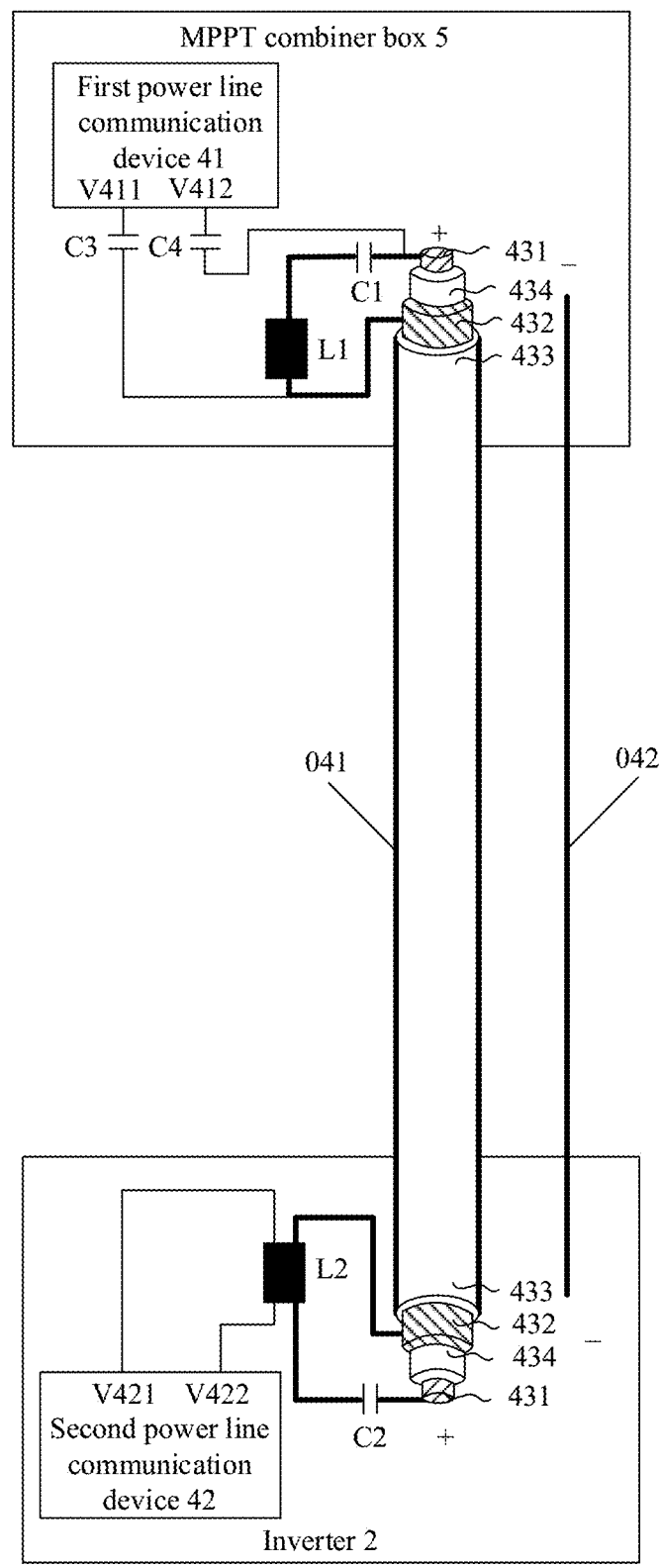
FIG. 13 is a schematic diagram of another structure of a power line communication apparatus according to an embodiment of this application.

In a possible implementation, the signal transmit end couples a modulated signal to the power line through capacitive coupling, and the signal receive end receives the modulated signal from the power line through electromagnetic coupling. In this case, a structure of the power line communication apparatus is shown in FIG. 13. In the power line communication apparatus shown in FIG. 13, for a specific structure and an operating principle on the side of the signal transmit end, refer to the related descriptions on the side of the signal transmit end shown in FIG. 11, and for a specific structure and an operating principle on the side of the signal receive end, refer to the related descriptions on the side of the signal receive end shown in FIG. 10. Details are not described herein again.

Figure 14:
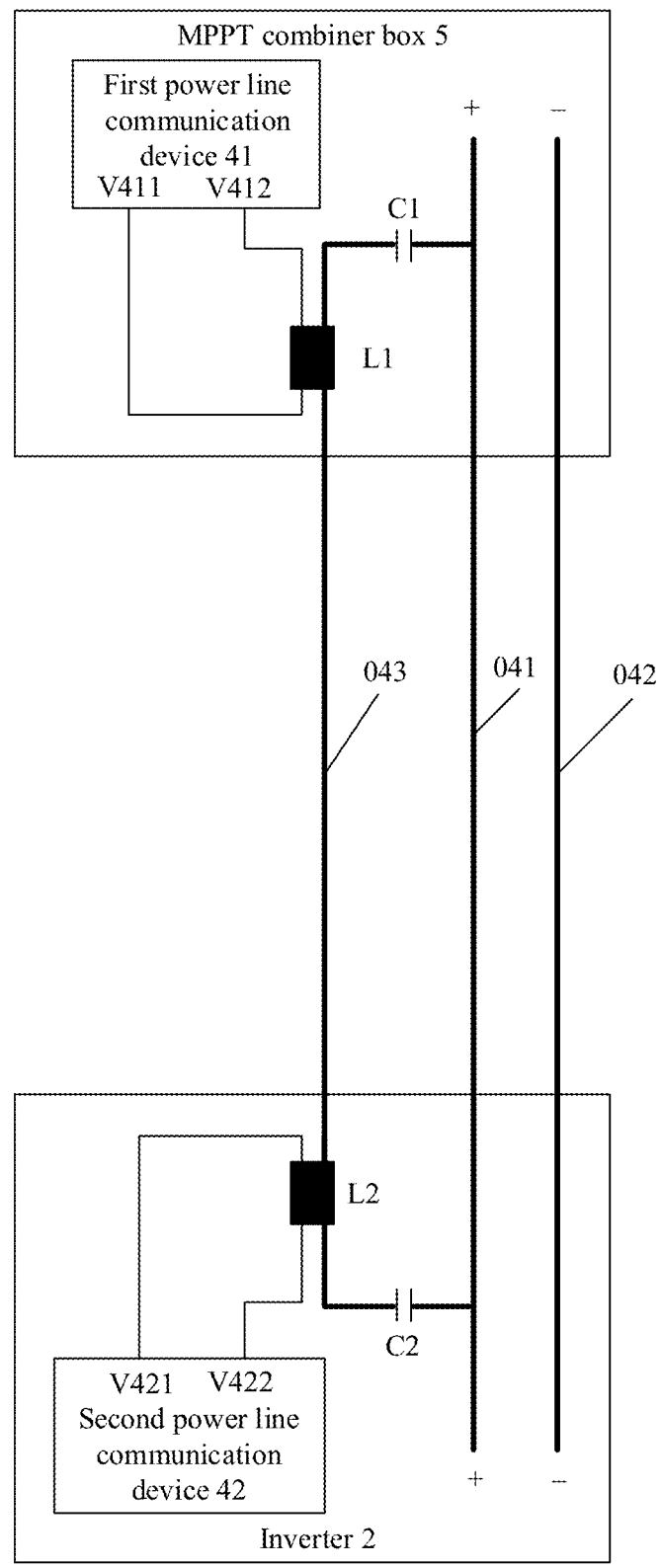
FIG. 14 is a schematic diagram of another structure of a power line communication apparatus according to an embodiment of this application.

Still refer to FIG. 14. FIG. 14 is a schematic diagram of a structure of another embodiment of a power line communication apparatus according to this application.

The power line communication apparatus shown in FIG. 14 includes a first power line communication device 41, a second power line communication device 42, a power line, a first magnetic ring L1 disposed on a side of the first power line communication device, and a second magnetic ring L2 disposed on a side of the second power line communication device. The power line includes a positive line 041 and a negative line 042. The positive line 041 and the negative line 042 may have the structure shown in FIG. 3. In FIG. 14, the positive line 041 and the negative line 042 are respectively simplified into two line segments, and a specific structure of each power line is not shown. The positive line 041 and the negative line 042 shown in FIG. 14 are configured to transmit electric energy.

The power line further includes a line 043, and the line 043 is not configured to transmit electric energy. Specifically, the line 043 may have the structure shown in FIG. 3, or may have a structure in which only an insulation layer wraps a wire. In FIG. 14, the line 043 is simplified into a line segment.

At a signal transmit end, the line 043 passes through the first magnetic ring L1, that is, the first magnetic ring L1 is coupled to the line 043 through the wire. At a signal receive end, the line 043 passes through the second magnetic ring L2, that is, the second magnetic ring L2 is coupled to the line 043 through the wire. Because the line 043 does not transmit electric energy, for the first magnetic ring L1 and the second magnetic ring L2, inductance of the magnetic rings does not sharply decrease due to an excessively large current transmitted on the power line, thereby improving the stability of the magnetic rings. Herein, it should be noted that, when the line 043 has the structure shown in FIG. 3, in a case of coupling the first magnetic ring L1 and the second magnetic ring L2 to the line 043, the first magnetic ring L1 and the second magnetic ring L2 may be coupled to the wire of the line 043, or may be coupled to the shield layer of the line 043. Specifically, at the signal transmit end and the signal receive end, the wire or the shield layer of the line 043 may be separately exposed, the wire is extended out from an OT terminal, and the first magnetic ring L1 and the second magnetic ring L2 are coupled to the wire or the shield layer of the line 043. When the line 043 has the structure in which the insulation layer wraps the wire, because there is no shield layer, the line 043 may pass through the first magnetic ring L1 and the second magnetic ring L2 at the signal transmit end and the signal receive end respectively, to couple the first magnetic ring L1 and the second magnetic ring L2 to the line 043.

In a possible implementation, the signal transmit end couples a modulated signal to the power line through electromagnetic coupling, and the signal receive end receives the modulated signal from the power line through electromagnetic coupling.

Specifically, a line extending out from a first end V411 of the first power line communication device 41 is connected to a second end V412 of the first power line communication device 41 through the magnetic ring L1, and a line extending out from a first end V421 of the second power line communication device 42 is connected to a second end V422 of the second power line communication device 42 through the magnetic ring L2. In FIG. 14, the positive line 041 and the line 043 are configured to jointly transmit the modulated signal. Herein, the positive line 041 and the line 043 extend from the signal transmit end to the signal receive end. On a side of the signal transmit end, the positive line 041 is connected to the line 043 through a capacitor C1. On a side of the signal receive end, the positive line 041 is connected to the line 043 through a capacitor C2. The modulated signal transmitted by the first power line communication device 41 is coupled to the line 043 through the first magnetic ring L1. The modulated signal is an intermediate- or high-frequency signal, and a frequency is usually within a frequency range of kHz to MHz. Therefore, the modulated signal coupled to the line 043 is transmitted to the positive line 041 through the capacitor C1, and a signal loop is formed between the positive line 041 and the line 043 to transmit the modulated signal to the signal receive end. At the signal receive end, the signal coupled to the positive line 041 is transmitted to the line 043 through the capacitor C2. The second power line communication device 42 may receive the modulated signal from the line 043 through the second magnetic ring L2.

It can be learned from FIG. 14 that a modulated signal loop is formed by using the positive line 041 for transmitting electric energy and the line 043 not for transmitting electric energy, and the magnetic rings are disposed on the wire 043 not for transmitting electric energy, thereby reducing signal attenuation and improving the reliability of the signal transmission.

Figure 15:
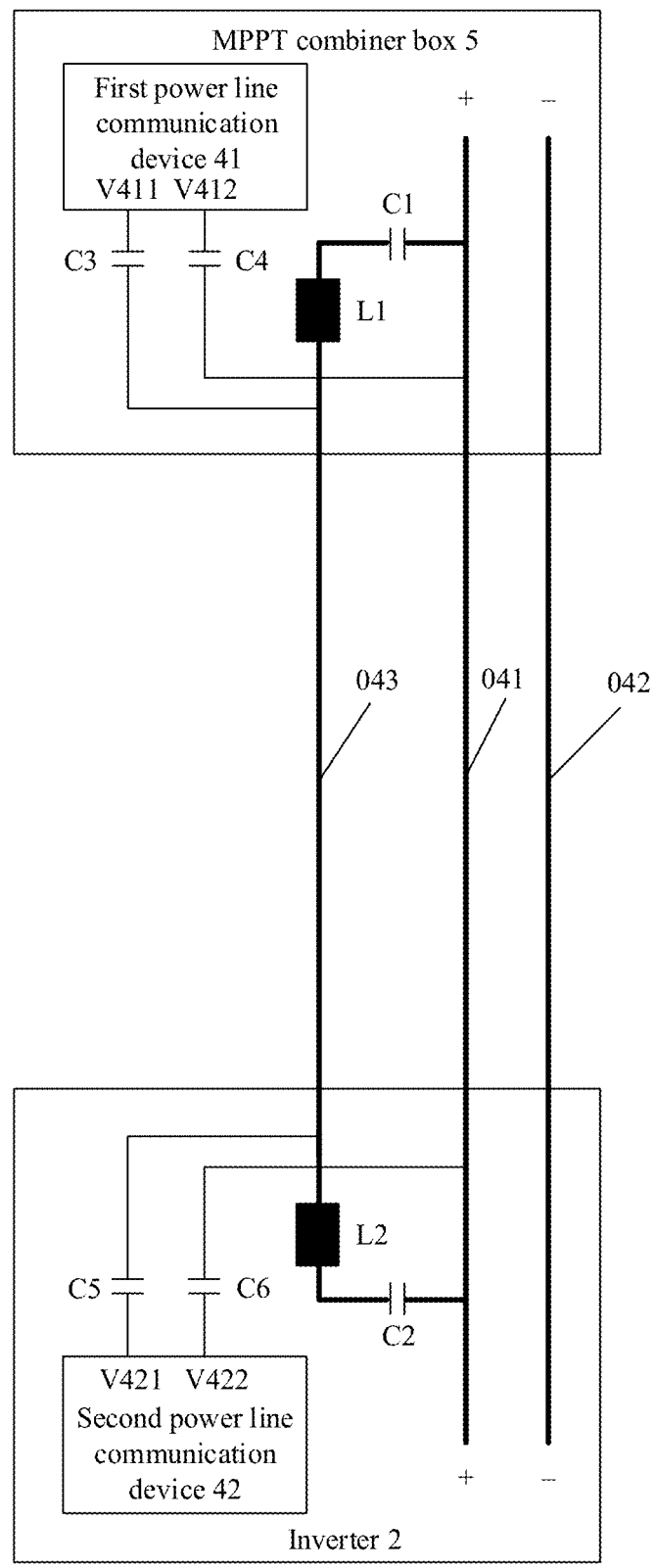
FIG. 15 is a schematic diagram of another structure of a power line communication apparatus according to an embodiment of this application.

In a possible implementation, the signal transmit end couples a modulated signal to the power line through capacitive coupling, and the signal receive end receives the modulated signal from the power line through capacitive coupling. FIG. 15 is a schematic diagram of a structure of another embodiment of a power line communication apparatus according to this application.

Specifically, the first end V411 of the first power line communication device 41 is connected to one end of a capacitor C3, the other end of the capacitor C3 is connected to the line 043, the second end V412 of the first power line communication device 41 is connected to one end of a capacitor C4, the other end of the capacitor C4 is connected to the positive line 041, the first end V421 of the second power line communication device 42 is connected to one end of a capacitor C5, the other end of the capacitor C5 is connected to the line 043, the second end V422 of the second power line communication device 42 is connected to one end of a capacitor C6, and the other end of the capacitor C6 is connected to the positive line 041.

The modulated signal transmitted by the first power line communication device 41 is coupled to the positive line 041 and the line 043 through the capacitor C3 and the capacitor C4 respectively, to transmit the modulated signal to the signal receive end. At the signal receive end, the second power line communication device 42 may receive the modulated signal from the positive line 041 and the line 043 through the capacitor C5 and the capacitor C6 respectively.

Figure 16:
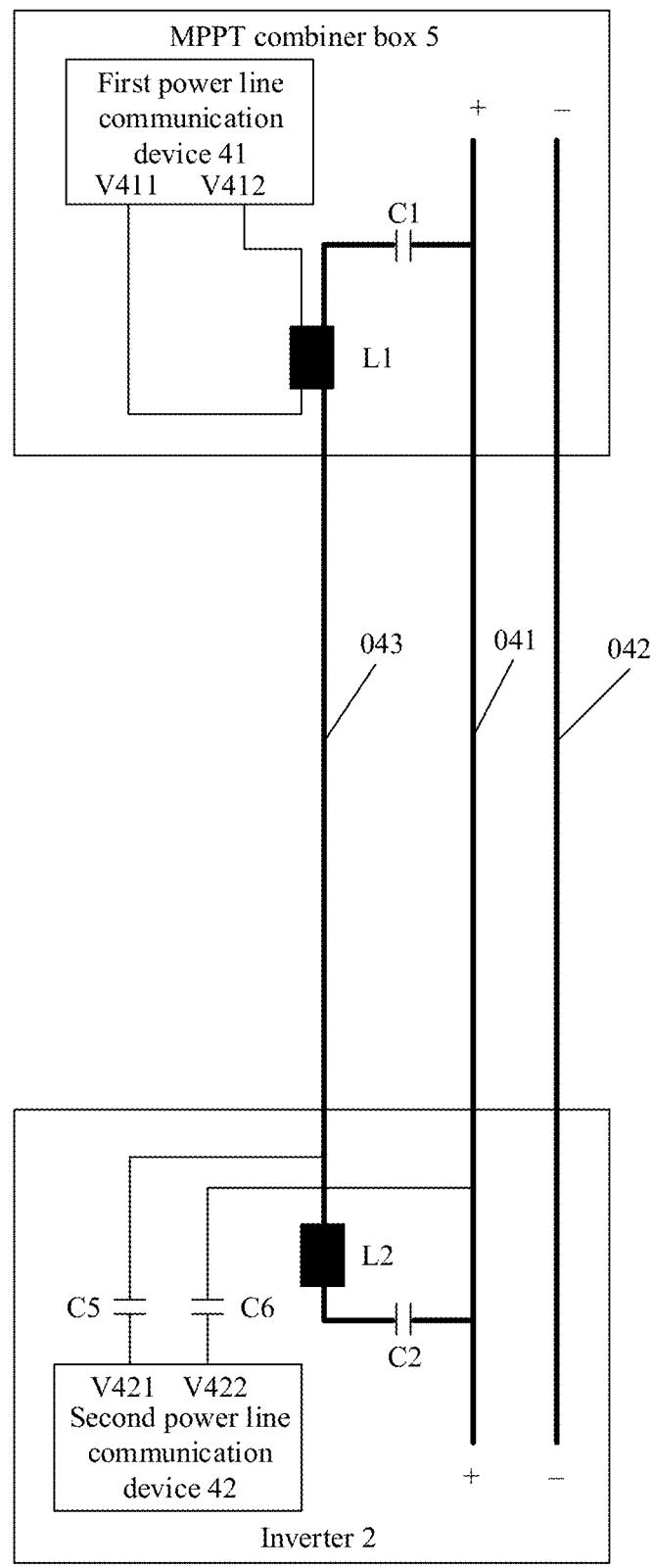
FIG. 16 is a schematic diagram of another structure of a power line communication apparatus according to an embodiment of this application.

In a possible implementation, the signal transmit end couples a modulated signal to the power line through electromagnetic coupling, and the signal receive end receives the modulated signal from the power line through capacitive coupling. In this case, a structure of the power line communication apparatus is shown in FIG. 16. In the power line communication apparatus shown in FIG. 16, for a specific structure and an operating principle on the side of the signal transmit end, refer to the related descriptions on the side of the signal transmit end shown in FIG. 14, and for a specific structure and an operating principle on the side of the signal receive end, refer to the related descriptions on the side of the signal receive end shown in FIG. 15. Details are not described herein again.

Figure 17:
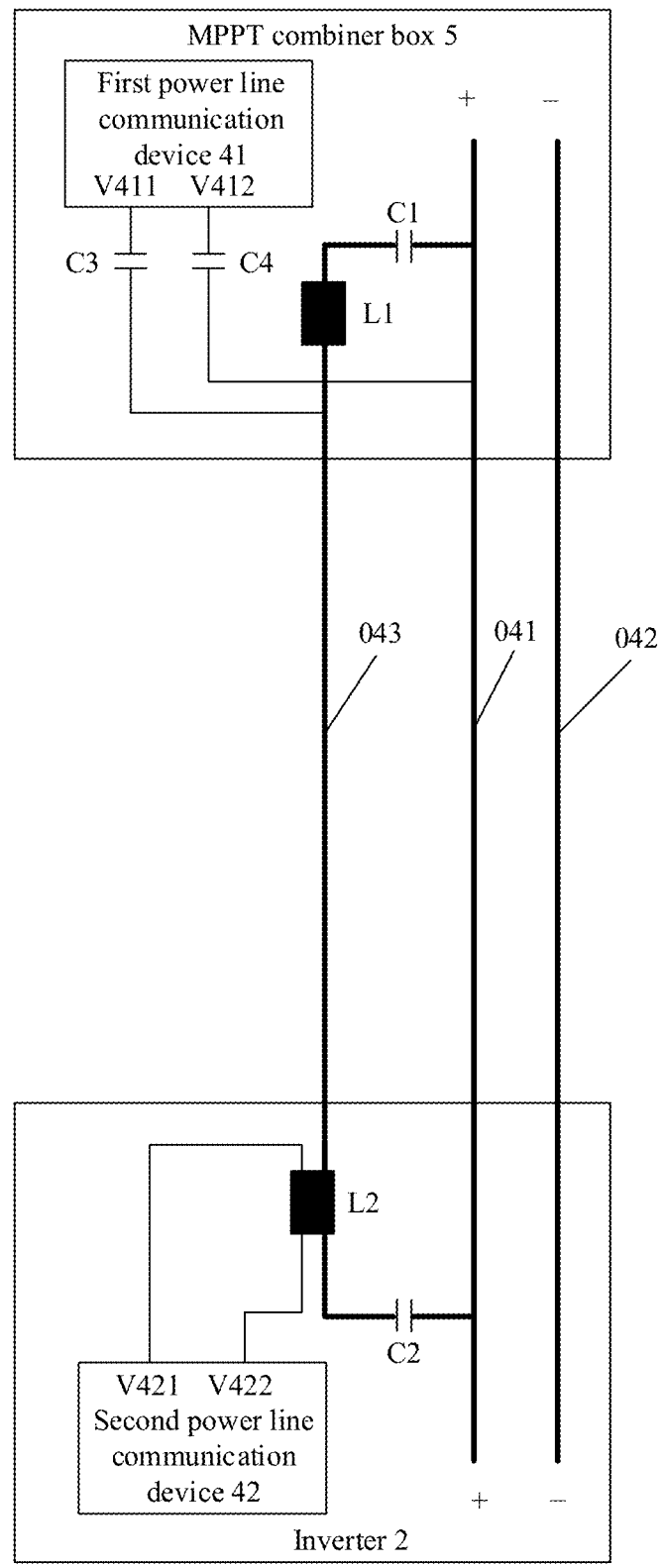
FIG. 17 is a schematic diagram of another structure of a power line communication apparatus according to an embodiment of this application.

In a possible implementation, the signal transmit end couples a modulated signal to the power line through capacitive coupling, and the signal receive end receives the modulated signal from the power line through electromagnetic coupling. In this case, a structure of the power line communication apparatus is shown in FIG. 17. In the power line communication apparatus shown in FIG. 17, for a specific structure and an operating principle on the side of the signal transmit end, refer to the related descriptions on the side of the signal transmit end shown in FIG. 15, and for a specific structure and an operating principle on the side of the signal receive end, refer to the related descriptions on the side of the signal receive end shown in FIG. 14. Details are not described herein again.

Beneficial effects brought by the power line communication apparatus shown in any one of FIG. 14 to FIG. 17 are the same as those brought by the power line communication apparatus shown in FIG. 10 to FIG. 13. For details, refer to the related descriptions of the embodiments shown in FIG. 10 to FIG. 13. Details are not described herein again.

Figure 18:
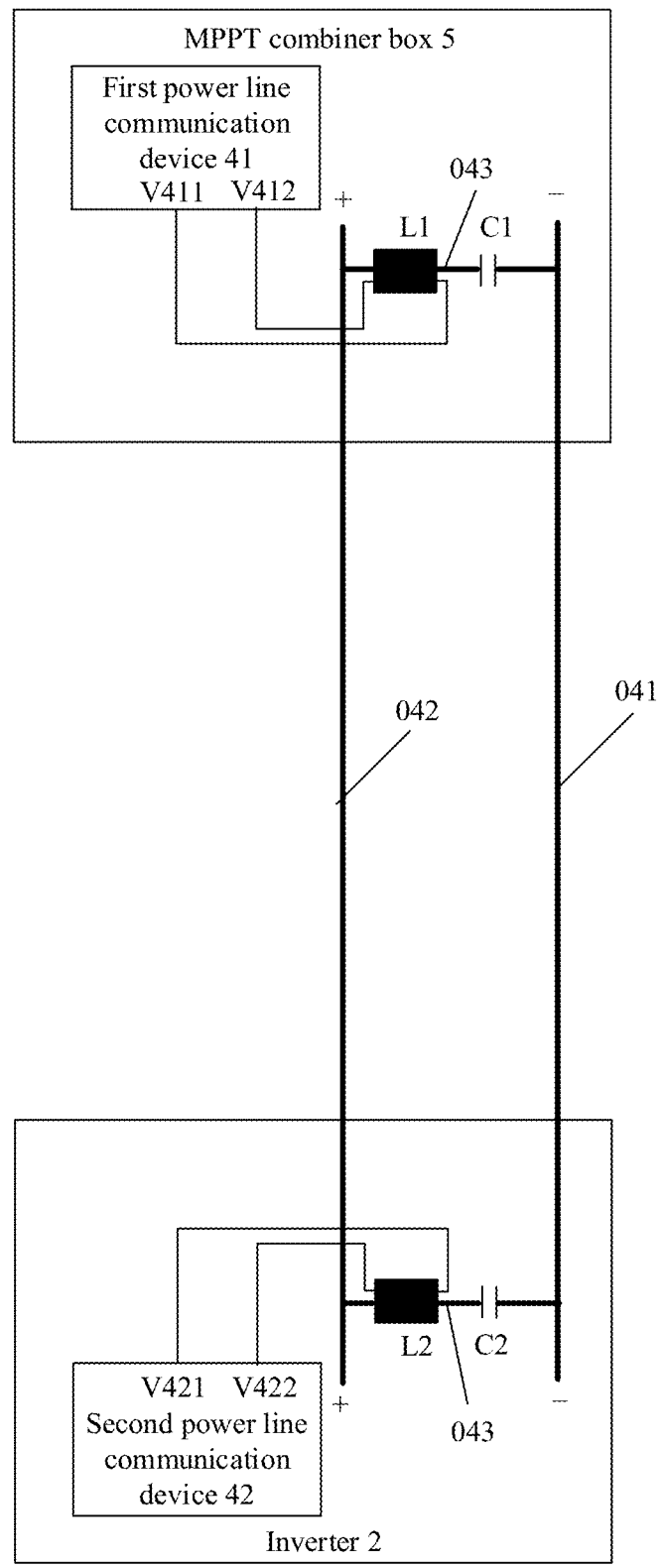
FIG. 18 is a schematic diagram of another structure of a power line communication apparatus according to an embodiment of this application.

Still refer to FIG. 18. FIG. 18 is a schematic diagram of a structure of another embodiment of the power line communication apparatus according to this application.

The power line communication apparatus shown in FIG. 18 includes a first power line communication device 41, a second power line communication device 42, a power line, a first magnetic ring L1 disposed on a side of the first power line communication device, and a second magnetic ring L2 disposed on a side of the second power line communication device. The power line includes a positive line 041 and a negative line 042. The positive line 041 and the negative line 042 may have the structure shown in FIG. 3. In FIG. 18, the positive line 041 and the negative line 042 are respectively simplified into two line segments, and a specific structure of each line is not shown. The positive line 041 and the negative line 042 shown in FIG. 18 are configured to transmit electric energy. At a signal transmit end, the positive line 041 is connected to the negative line 042 through a capacitor C1. At a signal receive end, the positive line 041 is connected to the negative line 042 through a capacitor C2. The capacitor C1 and the capacitor C2 are filter capacitors. Usually, relatively large currents flow through both the positive line 041 and the negative line 042. A differential-mode noise signal is usually generated between the positive line 041 and the negative line 042, and the capacitor C1 and the capacitor C2 are configured to filter out the differential-mode noise signal.

In FIG. 18, the power line further includes a plurality of lines 043 not for transmitting electric energy. At the signal transmit end, one end of the capacitor C1 is coupled to the positive line 041 through one of the lines 043, and the other end of the capacitor C1 is coupled to the negative line 042 through one of the lines 043. At the signal receive end, one end of the capacitor C2 is coupled to the positive line 041 through one of the lines 043, and the other end of the capacitor C2 is coupled to the negative line 042 through one of the lines 043. Electric energy transmitted by the MPPT combiner box 5 to the inverter 2 is direct-current power, and the capacitor C1 and the capacitor C2 have a function of "letting alternating-current power pass and blocking direct-current power". Therefore, no electric energy flows through the line 043. At the signal transmit end, one of the lines 043 passes through the first magnetic ring L1, that is, the first magnetic ring L1 is coupled to the line 043 on a side of the signal transmit end. At the signal receive end, one of the lines 043 passes through the second magnetic ring L2, that is, the second magnetic ring L2 is coupled to the line 043 on a side of the signal receive end. The first magnetic ring L1 and the second magnetic ring L2 are coupled to the line 043 to suppress inductance reduction of the magnetic rings, thereby improving the stability of the magnetic rings and the reliability of the signal transmission.

In a possible implementation, the signal transmit end couples a modulated signal to the power line through electromagnetic coupling, and the signal receive end receives the modulated signal from the power line through electromagnetic coupling.

Specifically, a line extending out from a first end V411 of the first power line communication device 41 is connected to a second end V412 of the first power line communication device 41 through the magnetic ring L1, and a line extending out from a first end V421 of the second power line communication device 42 is connected to a second end V422 of the second power line communication device 42 through the magnetic ring L2. Herein, the positive line 041 and the negative line 042 extend from the signal transmit end to the signal receive end. The modulated signal transmitted by the first power line communication device 41 is coupled to the line 043 through the first magnetic ring L1. The modulated signal coupled to the line 043 is transmitted to the positive line 041 and the negative line 042 through the line 043 and the capacitor C1, and a signal loop is formed between the positive line 041, the negative line 042, and the line 043 to transmit the modulated signal to the signal receive end. At the signal receive end, the modulated signal coupled to the positive line 041 and the negative line 042 is transmitted to the line 043, and the second power line communication device 42 may receive the modulated signal from a second electronic sub-line, such as the line 043 through the second magnetic ring L2.

It can be learned from FIG. 18 that, unlike the embodiments shown in FIG. 10 to FIG. 17, in this embodiment, the magnetic rings are disposed on the line 043 that couples the capacitors to the positive line 041, and the modulated signal is coupled to the positive line and the negative line through the line 043, thereby reducing signal attenuation, improving the reliability of the signal transmission, and further reducing construction costs.

Figure 19:
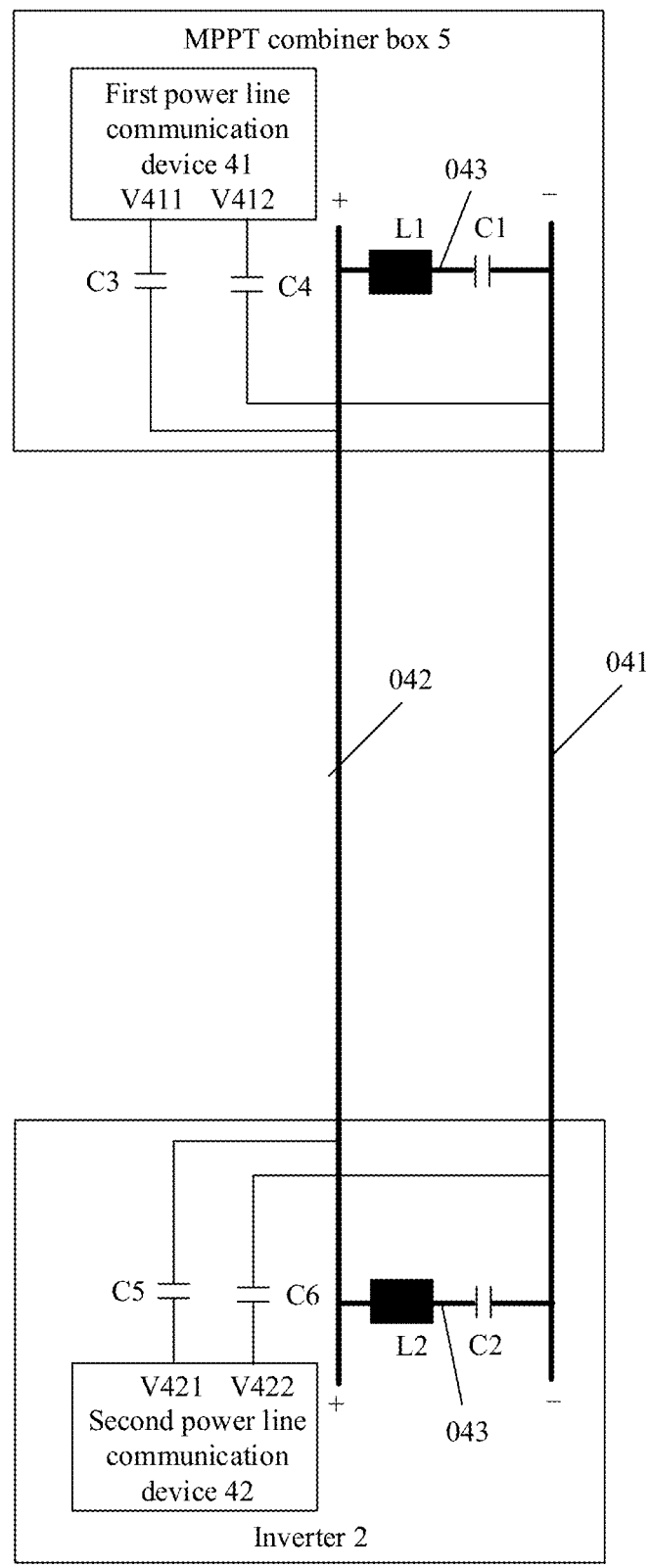
FIG. 19 is a schematic diagram of another structure of a power line communication apparatus according to an embodiment of this application.

In a possible implementation, the signal transmit end couples a modulated signal to the power line through capacitive coupling, and the signal receive end receives the modulated signal from the power line through capacitive coupling. FIG. 19 is a schematic diagram of another structure of a power line communication apparatus according to an embodiment of this application.

Specifically, the first end V411 of the first power line communication device 41 is connected to one end of a capacitor C3, the other end of the capacitor C3 is connected to the positive line 041, the second end V412 of the first power line communication device 41 is connected to one end of a capacitor C4, the other end of the capacitor C4 is connected to the negative line 042, the first end V421 of the second power line communication device 42 is connected to one end of a capacitor C5, the other end of the capacitor C5 is connected to the positive line 041, the second end V422 of the second power line communication device 42 is connected to one end of a capacitor C6, and the other end of the capacitor C6 is connected to the negative line 042.

The modulated signal transmitted by the first power line communication device 41 is coupled to the positive line 041 and the negative line 042 through the capacitor C3 and the capacitor C4 respectively, to transmit the modulated signal to the signal receive end. At the signal receive end, the second power line communication device 42 may receive the modulated signal from the positive line 041 and the negative line 042 through the capacitor C5 and the capacitor C6 respectively.

It can be learned from FIG. 19 that a signal loop is formed between the first end V411 and the second end V412 of the first power line communication device 41, the positive line 041, the negative line 042, and the first end V421 and the second end V422 of the second power line communication device 42. To suppress the differential-mode noise signal, a capacitor C1 is connected between the positive line 041 and the negative line 042 on a side of the signal transmit end, and a capacitor C2 is connected between the positive line 041 and the negative line 042 on a side of the signal receive end. The capacitor C1 and the capacitor C2 herein are filter capacitors. The first magnetic ring L1 and the second magnetic ring L2 shown in FIG. 19 are configured to provide large impedances for suppressing transmission of the modulated signal on the capacitor C1 and the capacitor C2. It can be learned from FIG. 19 that the first magnetic ring L1 and the second magnetic ring L2 are disposed on the line 043, to suppress inductance attenuation of the magnetic rings and keep the impedance of the magnetic rings within a stable range. For functions and operating principles of the capacitor C1, the capacitor C2, the first magnetic ring L1, and the second magnetic ring L2 in the power line communication apparatus, refer to the related descriptions of the capacitor C1, the capacitor C2, the first magnetic ring L1, and the second magnetic ring L2 shown in FIG. 11. Details are not described herein again.

It should be noted that, when capacitances of the capacitor C1 and the capacitor C2 are so small that the impedance generated by the capacitor C1 and the capacitor C2 can be totally ignored with respect to the modulated signal, a first magnetic ring L1 and a second magnetic ring L2 with quite small inductances may be alternatively used, or no first magnetic ring L1 or second magnetic ring L2 may be used. This can further simplify a structure of the power line communication apparatus, thereby reducing costs.

Figure 20:
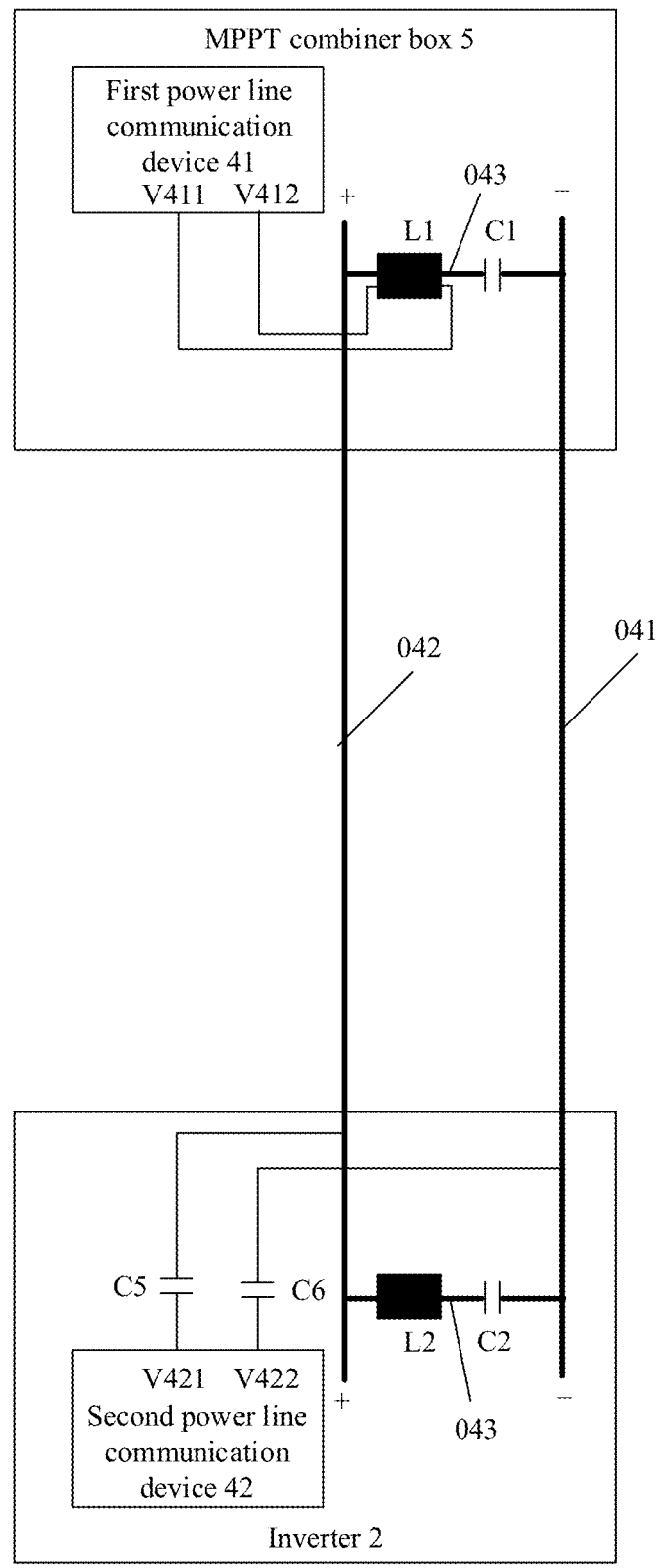
FIG. 20 is a schematic diagram of another structure of a power line communication apparatus according to an embodiment of this application.

In a possible implementation, the signal transmit end couples a modulated signal to the power line through electromagnetic coupling, and the signal receive end receives the modulated signal from the power line through capacitive coupling. In this case, a structure of the power line communication apparatus is shown in FIG. 20. In the power line communication apparatus shown in FIG. 20, for a specific structure and an operating principle on the side of the signal transmit end, refer to the related descriptions on the side of the signal transmit end shown in FIG. 18, and for a specific structure and an operating principle on the side of the signal receive end, refer to the related descriptions on the side of the signal receive end shown in FIG. 19. Details are not described herein again.

Figure 21:
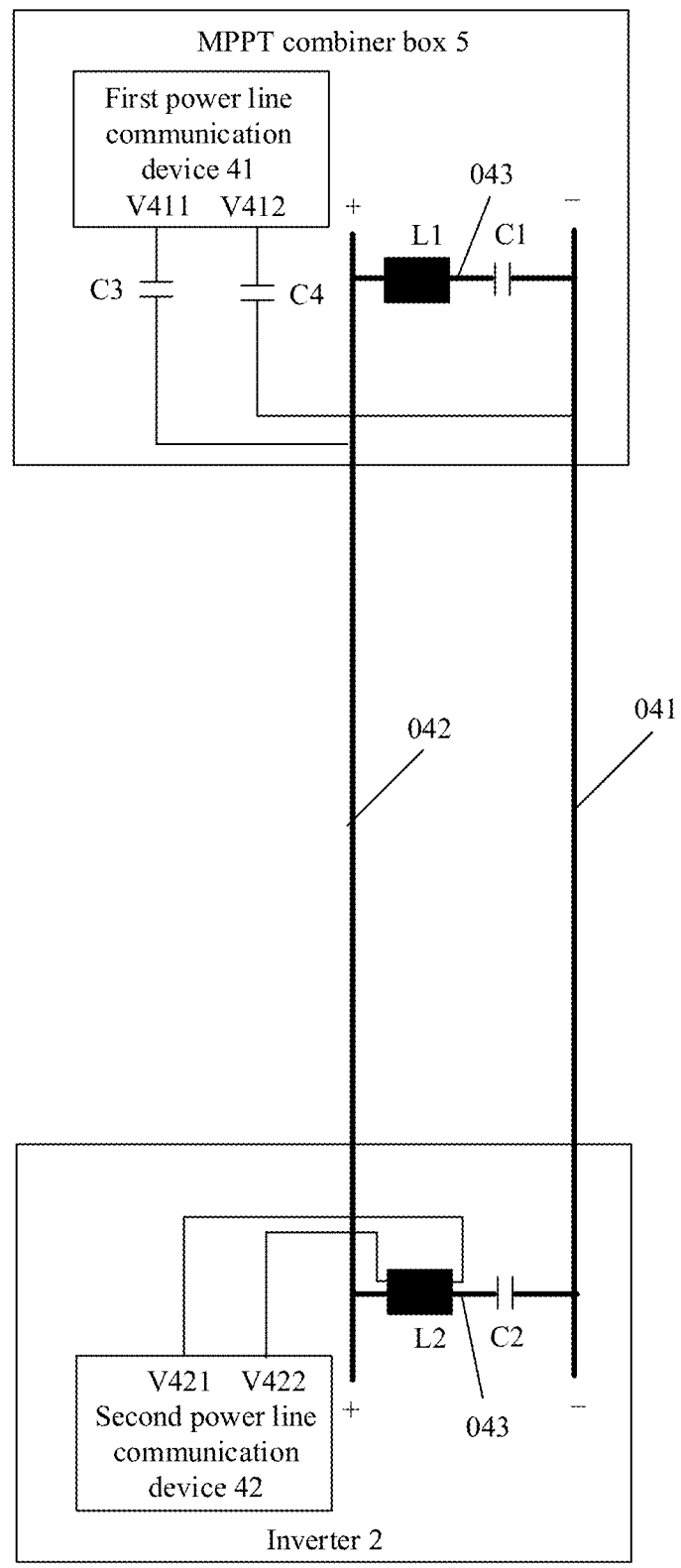
FIG. 21 is a schematic diagram of another structure of a power line communication apparatus according to an embodiment of this application.

In a possible implementation, the signal transmit end couples a modulated signal to the power line through capacitive coupling, and the signal receive end receives the modulated signal from the power line through electromagnetic coupling. In this case, a structure of the power line communication apparatus is shown in FIG. 21. In the power line communication apparatus shown in FIG. 21, for a specific structure and an operating principle on the side of the signal transmit end, refer to the related descriptions on the side of the signal transmit end shown in FIG. 19, and for a specific structure and an operating principle on the side of the signal receive end, refer to the related descriptions on the side of the signal receive end shown in FIG. 18. Details are not described herein again.

Herein, it should be noted that, in the implementations shown in the foregoing embodiments, to ensure that the second power line communication device can effectively receive the modulated signal from the power line, the first end of the first power line communication device and the first end of the second power line communication device are coupled to a same line or a same part of the power line, and the second end of the first power line communication device and the second end of the second power line communication device are coupled to a same line or a same part of the power line.

The foregoing describes embodiments of this application with reference to the accompanying drawings. However, this application is not limited to the foregoing specific implementations. The foregoing specific implementations are merely examples, and are not limitative. Inspired by this application, a person of ordinary skill in the art may also make many modifications without departing from the purposes of this application and the protection scope of the claims, and all the modifications shall fall within the protection scope of this application.

What is claimed is:

1. A power line communication apparatus comprising:
a power line including a signal transmit end and a signal receive end, a first power line communication device disposed at the signal transmit end, a second power line communication device disposed at the signal receive end, a first magnetic ring disposed at the signal transmit end, and a second magnetic ring disposed at the signal receive end;
the power line being configured to transmit, from the signal transmit end to the signal receive end, a modulated signal coupled by the first power line communication device through the first magnetic ring, so that the second power line communication device receives the modulated signal from the power line through the second magnetic ring;
the power line comprises a wire for transmitting electric energy and a shield layer that wraps the wire for electromagnetic shielding, and the wire and the shield layer extend from the signal transmit end to the signal receive end; and
the first magnetic ring and the second magnetic ring are coupled to the shield layer.

2. The power line communication apparatus according to claim 1, wherein an output end of the first power line communication device is coupled to the first magnetic ring; and
the modulated signal is coupled to the wire and the shield layer through the first magnetic ring.

3. The power line communication apparatus according to claim 1, wherein a first signal output end of the first power line communication device is coupled to the wire of the power line through a first capacitor, and a second signal output end of the first power line communication device is coupled to the shield layer of the power line through a second capacitor; and
the modulated signal is coupled to the wire and the shield layer through the first capacitor and the second capacitor.

4. The power line communication apparatus according to claim 1, wherein an output end of the second power line communication device is coupled to the second magnetic ring; and
the second power line communication device receives the modulated signal from the wire and the shield layer through the second magnetic ring.

5. The power line communication apparatus according to claim 1, wherein a first signal receive end of the second power line communication device is coupled to the wire through a third capacitor, and a second signal receive end of the second power line communication device is coupled to the shield layer through a fourth capacitor; and
the second power line communication device receives the modulated signal from the wire and the shield layer through the third capacitor and the fourth capacitor.

6. The power line communication apparatus according to claim 1, wherein the power line communication apparatus further comprises a fifth capacitor and a sixth capacitor;
at the signal transmit end, the wire is coupled to the shield layer through the fifth capacitor; and
at the signal receive end, the wire is coupled to the shield layer through the sixth capacitor.

7. A power line communication apparatus comprising:
a power line including a signal transmit end and a signal receive end, a first power line communication device disposed at the signal transmit end, a second power line communication device disposed at the signal receive end, a first magnetic ring disposed at the signal transmit end, and a second magnetic ring disposed at the signal receive end;
the power line being configured to transmit, from the signal transmit end to the signal receive end, a modulated signal coupled by the first power line communication device through the first magnetic ring, so that the second power line communication device receives the modulated signal from the power line through the second magnetic ring;
the power line comprises a first line for transmitting electric energy and a second line not for transmitting electric energy; and
the first magnetic ring and the second magnetic ring are coupled to the second line.

8. The power line communication apparatus according to claim 7, wherein the first line and the second line extend from the signal transmit end to the signal receive end, and the first line and the second line are insulated from each other.

9. The power line communication apparatus according to claim 7, further comprising a first capacitor, a second capacitor, and at least four second lines, wherein the first line comprises a first sub-line and a second sub-line;
the first line extends from the signal transmit end to the signal receive end;
the first capacitor is coupled between the first sub-line and the second sub-line through two of the second lines at the signal transmit end;
the second capacitor is coupled between the first sub-line and the second sub-line through two of the second lines at the signal receive end;
the first magnetic ring is coupled to one of the second lines located at the signal transmit end; and
the second magnetic ring is coupled to one of the second lines located at the signal receive end.

10. The power line communication apparatus according to claim 9, wherein an output end of the first power line communication device is coupled to the first magnetic ring; and
the modulated signal is coupled to the first sub-line and the second sub-line through the first magnetic ring.

11. The power line communication apparatus according to claim 9, wherein a first signal output end of the first power line communication device is coupled to the first line through a third capacitor, and a second signal output end of the first power line communication device is coupled to the second line through a fourth capacitor; and
the modulated signal is coupled to the first line and the second line through the third capacitor and the fourth capacitor.

12. The power line communication apparatus according to claim 10, wherein an output end of a second power line communication device is coupled to the second magnetic ring; and
the second power line device receives the modulated signal from the first sub-line and the second sub-line through the second magnetic ring.

13. The power line communication apparatus according to claim 12, wherein a first signal receive end of the second power line communication device is coupled to the first sub-line through a fifth capacitor, and a second signal receive end of the second power line communication device is coupled to the second sub-line through a sixth capacitor; and the second power line communication device receives the modulated signal from the first sub-line and the second sub-line through the fifth capacitor and the sixth capacitor.

14. The power line communication apparatus according to claim 7, wherein electric energy transmitted by the power line is direct-current electric energy or alternating-current electric energy.

15. A power generating system, comprising:
a plurality of power devices, a power line communication apparatus being disposed between every two of the power devices, wherein an intermediate- or high-frequency signal between every two of the power devices is transmitted through a power line routed between the two power devices;
wherein each power line communication apparatus comprises a power line including a signal transmit end and a signal receive end, a first power line communication device disposed at the signal transmit end, a second power line communication device disposed at the signal receive end, a first magnetic ring disposed at the signal transmit end, and a second magnetic ring disposed at the signal receive end;
the power line being configured to transmit, from the signal transmit end to the signal receive end, a modulated signal coupled by the first power line communication device through the first magnetic ring, so that the second power line communication device receives the modulated signal from the power line through the second magnetic ring;
the power line comprises a wire for transmitting electric energy and a shield layer that wraps the wire for electromagnetic shielding, and the wire and the shield layer extend from the signal transmit end to the signal receive end; and
the first magnetic ring and the second magnetic ring are coupled to the shield layer.

16. The power generating system according to claim 15, wherein an output end of the first power line communication device is coupled to the first magnetic ring; and
the modulated signal is coupled to the wire and the shield layer through the first magnetic ring.

17. The power generating system according to claim 15, wherein a first signal output end of the first power line communication device is coupled to the wire through a first capacitor, and a second signal output end of the first power line communication device is coupled to the shield layer through a second capacitor; and
the modulated signal is coupled to the wire and the shield layer through the first capacitor and the second capacitor.

18. The power generating system according to claim 15, wherein an output end of the second power line communication device is coupled to the second magnetic ring; and
the second power line communication device receives the modulated signal from the wire and the shield layer through the second magnetic ring.

19. The power generating system according to claim 15, wherein a first signal receive end of the second power line communication device is coupled to the wire through a third capacitor, and a second signal receive end of the second power line communication device is coupled to the shield layer through a fourth capacitor; and
the second power line communication device receives the modulated signal from the wire and the shield layer through the third capacitor and the fourth capacitor.

20. The power generation system according to claim 15, wherein the power line communication apparatus further comprises a fifth capacitor and a sixth capacitor;
the wire is coupled to the shield layer through the fifth capacitor at the signal transmit end; and
the wire is coupled to the shield layer through the sixth capacitor at the signal receive end.

* * * * *

UNITED STATES PATENT AND TRADEMARK OFFICE
CERTIFICATE OF CORRECTION

PATENT NO. : 11,637,589 B2
APPLICATION NO. : 17/825889
DATED : April 25, 2023
INVENTOR(S) : Wei Shui It is certified that error appears in the above-identified patent and that said Letters Patent is hereby corrected as shown below:

In the Claims

In Column 21, Line 9, in Claim 15, delete "system," and insert -- system --.

In Column 22, Line 30, in Claim 20, delete "generation" and insert -- generating --.

Signed and Sealed this
Twenty-seventh Day of June, 2023

Katherine Kelly Vidal
*Director of the United States Patent and Trademark Office*